No. 748,647. PATENTED JAN. 5, 1904.
T. L. PEACOCK.
ATTACHMENT FOR FEED TROUGHS.
APPLICATION FILED MAY 9, 1903.
NO MODEL. 2 SHEETS—SHEET 1.
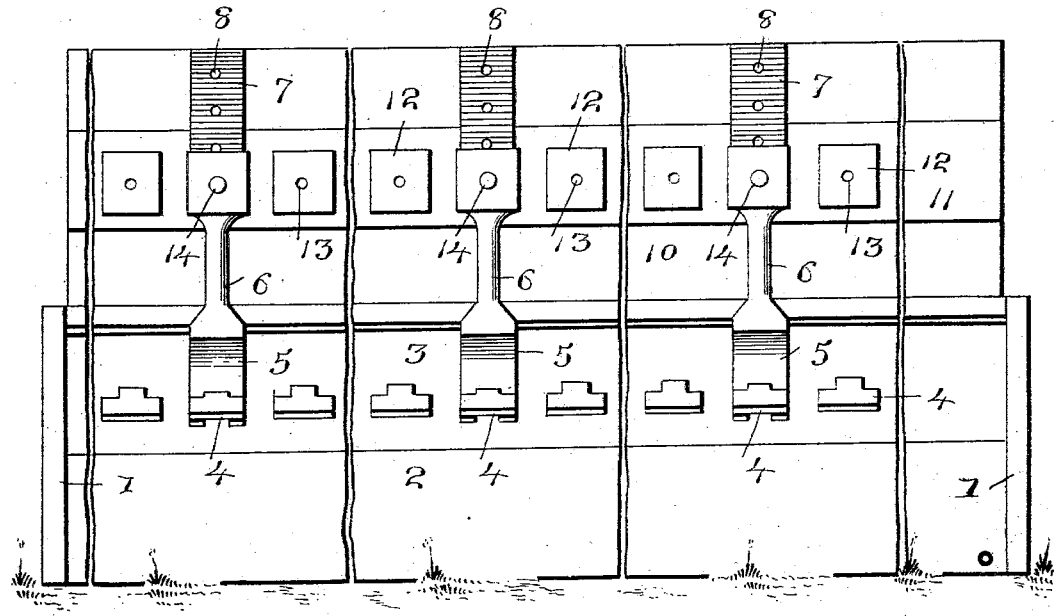
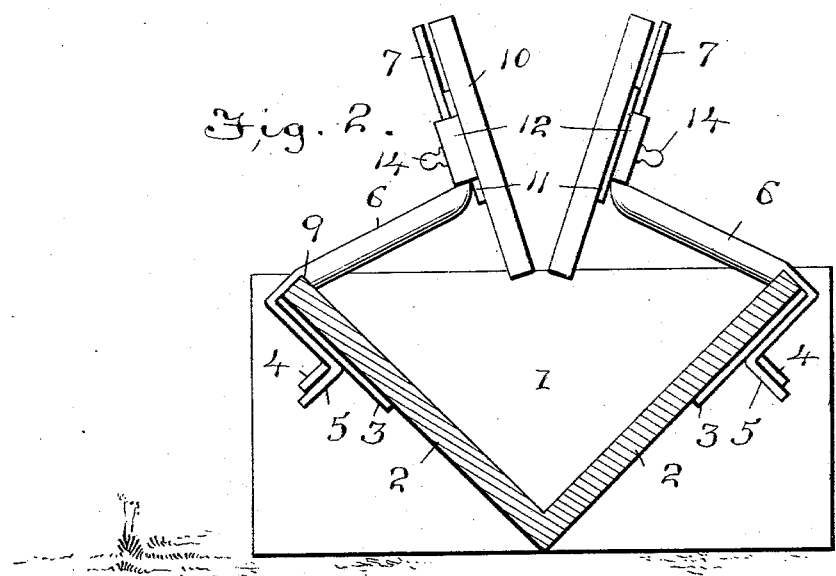
Inventor
Thomas L. Peacock.
By Victor J. Evans
Attorney
Witnesses
J. W. Riley.
Herbert D. Lawson No. 748,647. PATENTED JAN. 5, 1904.
T. L. PEACOCK.
ATTACHMENT FOR FEED TROUGHS.
APPLICATION FILED MAY 9, 1903.
NO MODEL. 2 SHEETS—SHEET 2.
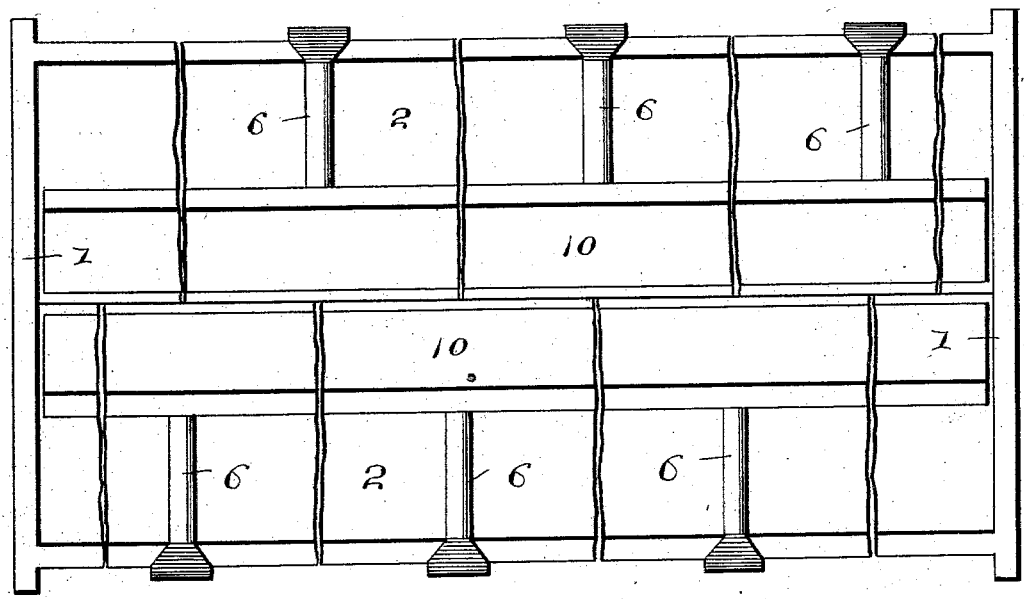
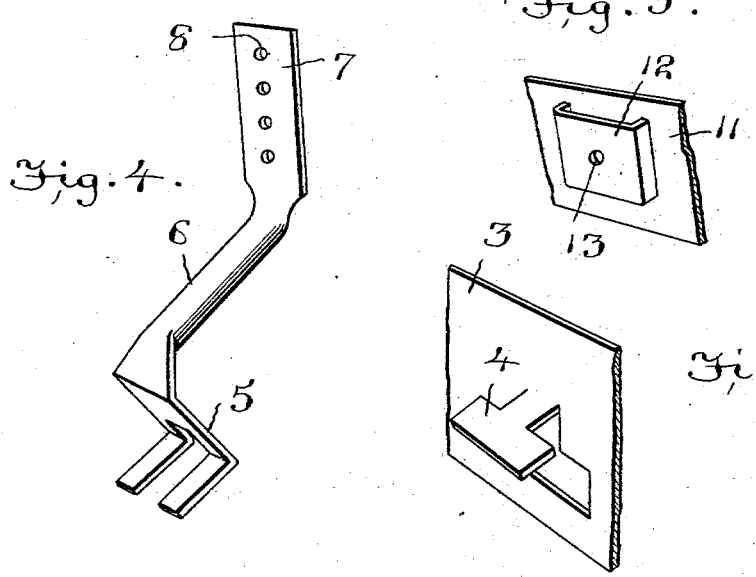
Witnesses
F. W. Riley
Herbert D. Lawson
Inventor
Thomas L. Peacock.
By Victor J. Evans
Attorney No. 748,647. Patented January 5, 1904.

UNITED STATES PATENT OFFICE.

THOMAS L. PEACOCK, OF UNION STAR, MISSOURI.

ATTACHMENT FOR FEED-TROUGHS.

SPECIFICATION forming part of Letters Patent No. 748,647, dated January 5, 1904.

Application filed May 9, 1903. Serial No. 156,403. (No model.)

*To all whom it may concern:*

Be it known that I, THOMAS L. PEACOCK, a citizen of the United States, residing at Union Star, in the county of Dekalb and State of Missouri, have invented new and useful Improvements in Attachments for Feed-Troughs, of which the following is a specification.

My invention relates to new and useful improvements in attachments for feed-troughs; and its object is to provide an attachment which may be quickly placed in position upon a trough and which will prevent hogs from wallowing therein. A further object is to provide means whereby the attachment may be adjusted from or toward the trough.

A further object is to employ novel means for securing the attachment to the trough.

With the above and other objects in view the invention consists in arranging T-shaped arms along each side of the trough and these are engaged by forked L-shaped arms extending from rods which bear upon the upper edges of the trough and are adjustably connected to inclined boards which extend longitudinally of the trough and form a hopper through which the food may be supplied to the trough.

The invention also consists in the further novel construction and combination of parts hereinafter more fully described and claimed, and illustrated in the accompanying drawings, showing the preferred form of my invention, and in which—

Figure 1 is a side elevation of a trough having my improved attachment thereon, said trough being broken away. Fig. 2 is a section through the trough and showing the attachment in elevation. Fig. 3 is a plan view of the trough having my attachment thereon, the trough being broken away. Fig. 4 is a detail view of one of the supporting-arms of the attachment. Fig. 5 is a perspective view of a bracket for the reception of the arms, and Fig. 6 is a detail view of a T-shaped arm adapted to be engaged by a supporting-arm.

Referring to the figures by numerals of reference, 1 1 are the ends of a feed-trough, and arranged between these ends are inclined longitudinally-extending boards 2, which form the body of the trough. To the outer surface of each of these boards and parallel with the upper edges thereof is secured a metal strip 3, having T-shaped arms 4 struck up therefrom at right angles to the strip 3. Each of these arms is adapted to be engaged by a forked L-shaped extension 5, arranged at one end of an arm 6, which is adapted to bear upon the upper edge of one of the boards 2 and is provided at its inner end with a flat extension 7, having a series of apertures 8 therein. The arm 6 is preferably cylindrical, as shown, and the end thereof adjacent the L-shaped extension 5 is preferably cut away, as shown at 9, so as to permit the upper edge of the board 2 to fit therein. Guard-strips 10 are arranged above the trough longitudinally thereof and each has a longitudinally-extending strip 11 secured thereto and provided with a series of brackets 12 equal in number to the arms 6 and at the same distance apart as said arms. These brackets are adapted to receive the flat extensions 7, and each bracket has an aperture 13 for the reception of a pin 14, which is adapted to engage any one of the apertures 8 and lock the guard-strips 10 to the extensions 7.

It will be seen that when the guard-strips 10 are in position upon the arms 6 a hopper is formed thereby through which food may be directed into the trough therebelow. By arranging the guard-strips 10 above the trough and by extending the arms 6 inward from the edges of the trough it will be understood that hogs will be prevented from climbing into the trough. The arms 6 can be readily removed from position over the trough by swinging them outward so as to release the forked ends of the arms from engagement with the T-shaped arms 4.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus described the invention, what is claimed as new is—

1. The combination with a trough; of longitudinally-extending guard-strips detachably connected to the sides of the trough and forming a hopper.

2. The combination with a trough of longitudinally-extending guard-strips detachably and adjustably connected to the sides of the trough and forming a hopper thereover.

3. The combination with a trough; of arms detachably secured thereto and extending inwardly therefrom, and longitudinally-extending guard-strips adjustably secured to the arms and forming a hopper.

4. The combination with a trough having arms extending laterally therefrom; of inwardly-extending arms detachably engaging the first-mentioned arms and adjustable guard-strips mounted upon the inwardly-extending arms and forming a hopper.

5. The combination with a trough having T-shaped arms extending laterally therefrom; of forked arms engaging the T-shaped arms and extending over the trough, and guard-strips adjustably secured to the forked arms and forming a hopper.

6. The combination with a trough having T-shaped arms extending therefrom; of inwardly-extending arms bearing upon and adapted to receive the edges of the trough, forked L-shaped extensions to the arms adapted to engage the T-shaped arms, and guard-strips adjustably secured to the inwardly-extending arms.

7. The combination with a trough having laterally-extending T-shaped arms; of inwardly-extending arms bearing upon and adapted to receive the edges of the trough, forked L-shaped extensions to said arms adapted to engage the T-shaped arms, upwardly-extending portions to the inwardly-extending arms, and guard-strips adjustably mounted upon said extensions and forming a hopper.

In testimony whereof I affix my signature in presence of two witnesses.

THOMAS L. PEACOCK.

Witnesses:
SAML. SHEPARD,
ROBERT STANTON.